US012286893B2

(12) United States Patent
Wang et al.

(10) Patent No.: US 12,286,893 B2
(45) Date of Patent: Apr. 29, 2025

(54) APPARATUS AND METHOD FOR PARTIALLY BLADED ROTOR TEST

(71) Applicant: RTX Corporation, Farmington, CT (US)

(72) Inventors: Zhiqiang Wang, South Glastonbury, CT (US); Nicholas J. Lawliss, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/238,191

(22) Filed: Aug. 25, 2023

(65) Prior Publication Data
US 2025/0067181 A1 Feb. 27, 2025

(51) Int. Cl.
| F01D 5/02 | (2006.01) |
| F04D 29/66 | (2006.01) |
| F16F 15/32 | (2006.01) |
| G01M 1/32 | (2006.01) |

(52) U.S. Cl.
CPC ............ *F01D 5/027* (2013.01); *F04D 29/662* (2013.01); *F05D 2260/15* (2013.01); *F16F 15/32* (2013.01); *F16F 15/322* (2013.01); *G01M 1/32* (2013.01)

(58) Field of Classification Search
CPC ...... F01D 5/027; F01D 21/003; F04D 29/662; G01M 1/32; G01M 1/36; F16F 15/32; F16F 15/322
USPC ........................................................ 188/378
See application file for complete search history.

(56) References Cited

U.S. PATENT DOCUMENTS

| 3,916,495 A * | 11/1975 | Klassen | G01M 1/32 |
| | | | 29/888.011 |
| 4,716,761 A * | 1/1988 | Ito | G01M 1/04 |
| | | | 73/114.77 |
| 8,342,804 B2 * | 1/2013 | Pronovost | F01D 5/02 |
| | | | 416/182 |
| 9,777,574 B2 * | 10/2017 | Navale | F01D 5/027 |
| 10,190,655 B2 * | 1/2019 | Luinaud | G01M 1/02 |
| 2011/0083505 A1 | 4/2011 | Allen, IV et al. | |

(Continued)

FOREIGN PATENT DOCUMENTS

| CN | 215865771 U | 2/2022 |
| EP | 4345248 A1 | 4/2024 |

(Continued)

OTHER PUBLICATIONS

FR-3056629—translation from Espacenet (Year: 2018).*

(Continued)

*Primary Examiner* — Woody A Lee, Jr.
*Assistant Examiner* — Behnoush Haghighian
(74) *Attorney, Agent, or Firm* — CANTOR COLBURN LLP

(57) ABSTRACT

A rotor module, including: a blade cluster of a plurality of blades secured to a rotor disk of the rotor module; and counter weights secured to the rotor disk, wherein the counter weights cause a center of gravity of the plurality of blades to be zeroed out with respect to an axis "O" of the rotor disk and wherein the counter weights cause a moment of inertia Jx about an X axis of the rotor disk is equal to a moment of inertia Jy about a Y axis of the rotor disk when the rotor module is rotated about the axis "O".

10 Claims, 4 Drawing Sheets

(56) References Cited

U.S. PATENT DOCUMENTS

2018/0216466 A1* 8/2018 Heyden ............... G01M 13/025
2020/0011183 A1* 1/2020 Behr ........................ F01D 21/08

FOREIGN PATENT DOCUMENTS

FR          3056629 A1 *  3/2018    ............. F01D 5/027
WO       2021148743 A1     7/2021

OTHER PUBLICATIONS

Office Action; EP Application No. 24 196 180.4; mailed Dec. 5, 2024; 3 pages.
Extended European Search Report corresponding to EP Application No. 24196180.4; Issue date, Mar. 10, 2025, 12 pages.

* cited by examiner

APPARATUS AND METHOD FOR PARTIALLY BLADED ROTOR TEST

BACKGROUND

This disclosure relates to gas turbine engines, and more particularly to an apparatus and method for a partially bladed rotor test to render a bladed rotor so that its design can simultaneously reach the goals of a zero offset of mass centroid and symmetrical mass moments of inertia.

Gas turbine engines typically include a fan section, a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades. In addition, the fan section also includes rotating fan blades.

The fan blades, turbine blades and compressor blades, all rotate at high speeds. During the development phase of a new type of blade(s), the availability of the blades is often limited or otherwise expensive. Therefore, when testing the new blades it is desirable to have a partially bladed rotor due to the scarcity of the blades. However, this will result in a rotor with both an offset of mass centroid from its rotational center and an asymmetry of mass moments of inertia along its two principal moment of inertia axes, inducing a potential instability during rotation of the partially bladed rotor.

BRIEF DESCRIPTION

Disclosed is a rotor module, including: a blade cluster of a plurality of blades secured to a rotor disk of the rotor module; and counter weights secured to the rotor disk, wherein the counter weights cause a center of gravity of the plurality of blades to be zeroed out with respect to an axis "O" of the rotor disk and wherein the counter weights cause a moment of inertia Jx about an X axis of the rotor disk is equal to a moment of inertia Jy about a Y axis of the rotor disk when the rotor module is rotated about the axis "O".

In addition to one or more of the features described above, or as an alternative to any of the foregoing embodiments, the counter weights comprise a pair of counter weights and the pair of counter weights include a first counter weight group and a second counter weight group.

In addition to one or more of the features described above, or as an alternative to any of the foregoing embodiments, the first counter weight group comprises a pair of counter weights and the second counter weight group comprises a pair of counter weights.

In addition to one or more of the features described above, or as an alternative to any of the foregoing embodiments, the pair of counter weights of the first counter weight group are of different weights and the pair of counter weights and the second counter weight group are of different weights.

In addition to one or more of the features described above, or as an alternative to any of the foregoing embodiments, the "X" axis and the "Y" axis are each orthogonally arranged with respect to the axis of the rotor module, and forming a right hand coordinate system with respect to the rotor rotational direction.

In addition to one or more of the features described above, or as an alternative to any of the foregoing embodiments, the blade cluster and the counter weights are configured to provide a tri-lobe configuration with respect to the axis "O" of the rotor disk.

In addition to one or more of the features described above, or as an alternative to any of the foregoing embodiments, the pair of counter weights include a first counter weight group and a second counter weight group.

In addition to one or more of the features described above, or as an alternative to any of the foregoing embodiments, the first counter weight group comprises a pair of counter weights and the second counter weight group comprises a pair of counter weights.

In addition to one or more of the features described above, or as an alternative to any of the foregoing embodiments, the pair of counter weights of the first counter weight group are of different weights and the pair of counter weights and the second counter weight group are of different weights.

In addition to one or more of the features described above, or as an alternative to any of the foregoing embodiments, the center of gravity of the blade cluster is designated at a twelve clock position with respect to the axis "O" and one of the pair of counter weights is at a four clock position with respect to the axis "O" and the other one of the pair of counter weights is at an eight clock position with respect to the axis "O".

In addition to one or more of the features described above, or as an alternative to any of the foregoing embodiments, the pair of counter weights include a first counter weight group and a second counter weight group.

In addition to one or more of the features described above, or as an alternative to any of the foregoing embodiments, the first counter weight group comprises a pair of counter weights and the second counter weight group comprises a pair of counter weights.

In addition to one or more of the features described above, or as an alternative to any of the foregoing embodiments, the pair of counter weights of the first counter weight group are of different weights and the pair of counter weights and the second counter weight group are of different weights.

In addition to one or more of the features described above, or as an alternative to any of the foregoing embodiments, the plurality of blades are fan blades.

In addition to one or more of the features described above, or as an alternative to any of the foregoing embodiments, the plurality of blades are three fan blades.

Also disclosed is a method for zeroing out a center of gravity of a plurality of blades with respect to an axis "O" of a rotor disk the plurality of blades are secured to, including: securing a blade cluster of the plurality of blades to the rotor disk of a rotor module; and securing counter weights to the rotor disk, wherein the counter weights cause a center of gravity of the plurality of blades to be zeroed out with respect to the axis "O" of the rotor disk and wherein the counter weights cause a moment of inertia Jx about an X axis of the rotor disk is equal to a moment of inertia Jy about a Y axis of the rotor disk when the rotor module is rotated about axis "O".

In addition to one or more of the features described above, or as an alternative to any of the foregoing embodiments, the counter weights include a pair of counter weights including a first counter weight group and a second counter weight group and the blade cluster and the counter weights are configured to provide a tri-lobe configuration with respect to the axis "O" of the rotor disk.

In addition to one or more of the features described above, or as an alternative to any of the foregoing embodiments, the first counter weight group comprises a pair of counter weights and the second counter weight group comprises a pair of counter weights.

In addition to one or more of the features described above, or as an alternative to any of the foregoing embodiments, the pair of counter weights of the first counter weight group are of different weights and the pair of counter weights and the second counter weight group are of different weights.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
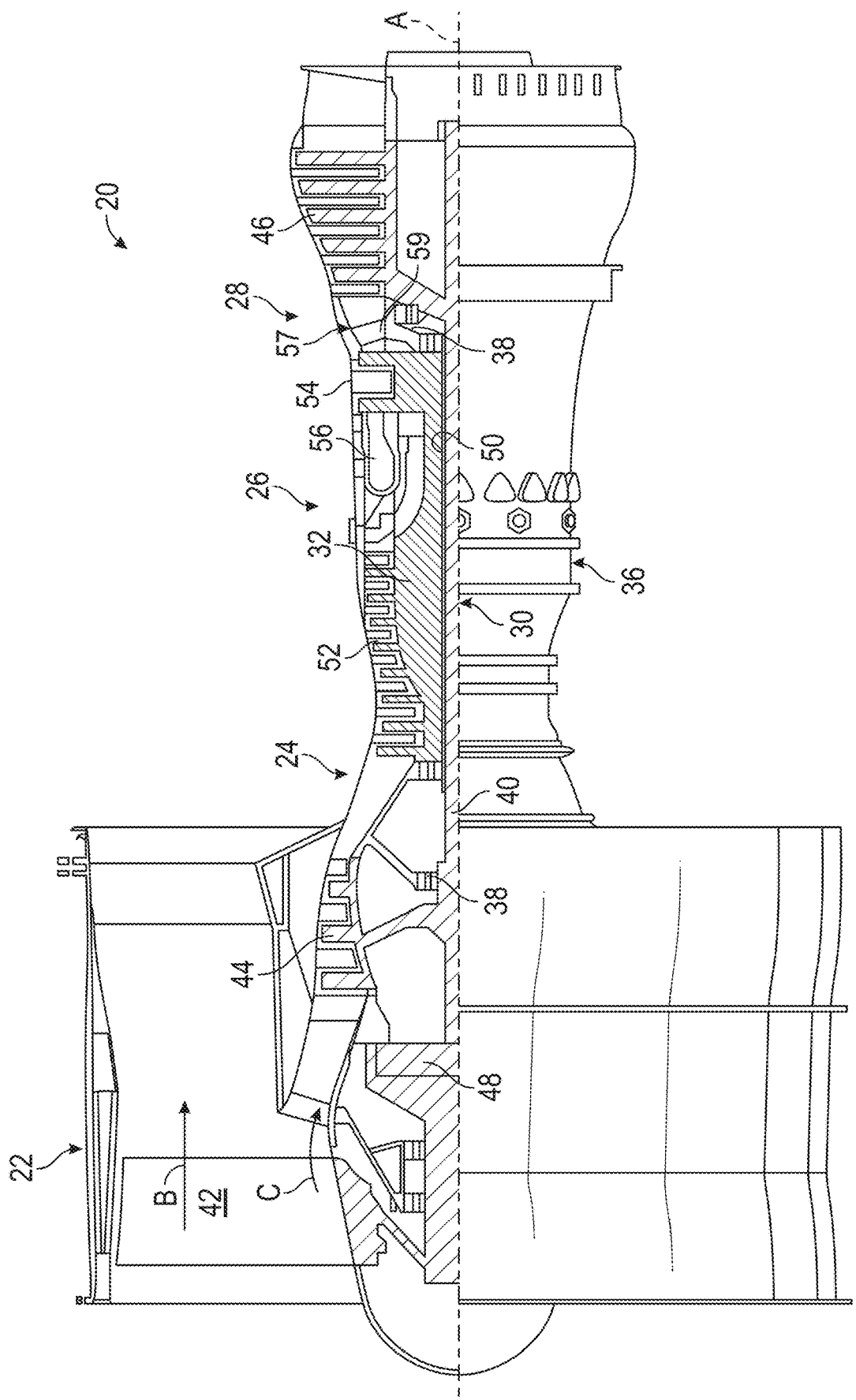
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including one- or three-spool architectures or other rotating machinery with bladed disks.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. It should be understood, however, that the above parameters are only exemplary of one embodiment of a geared architecture engine and that the present disclosure is applicable to other gas turbine engines including direct drive turbofans.

Figure 2:
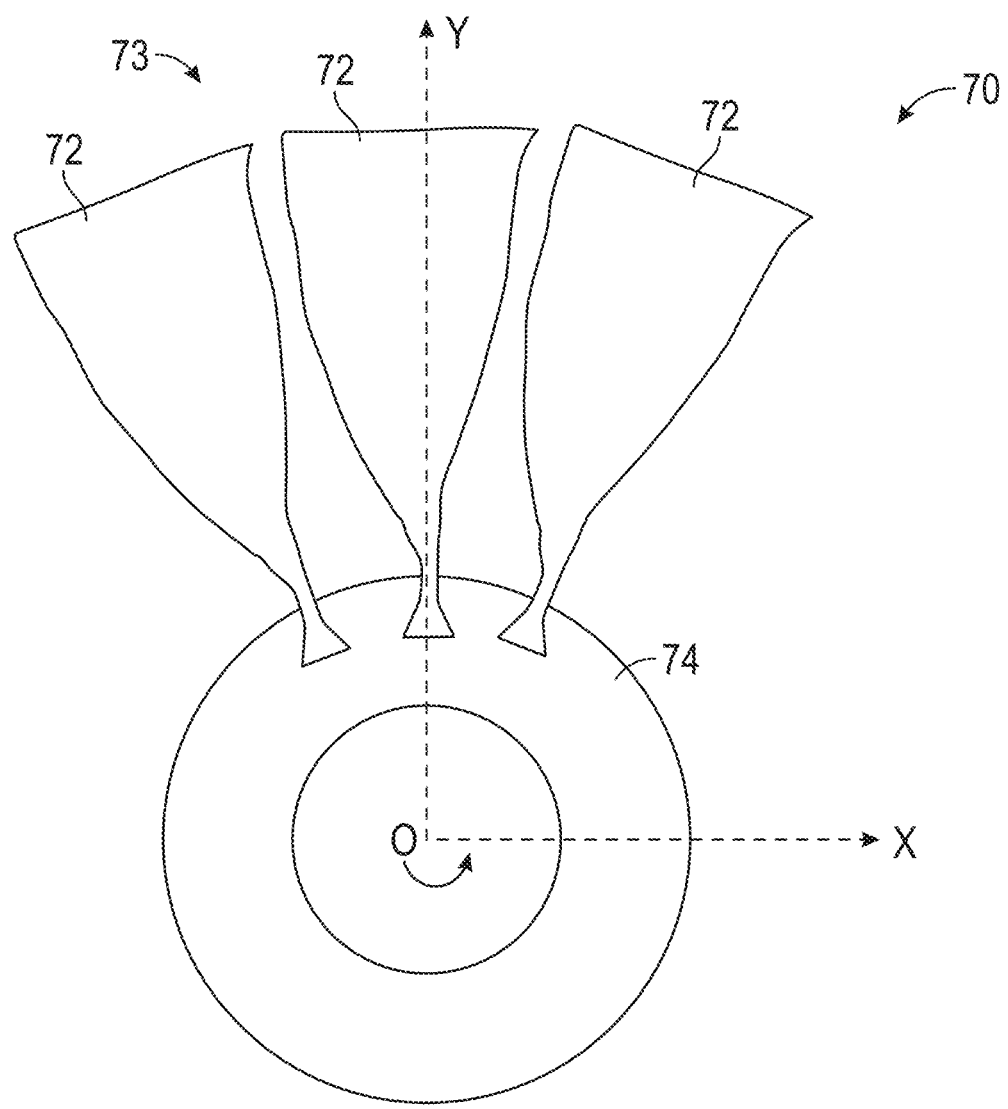
FIG. 2 is an end view of a rotor module with a limited amount of blades.

FIG. 2 illustrates an end view of an unsymmetrical rotor module 70 with a limited amount of blades, which in the illustrated embodiment may be fan blades 72 of the fan 42. The rotor module 70 includes a rotor or rotor disk 74 to which a plurality of fan blades 72 are secured thereto for testing. The rotor module 70 is configured to be rotated about an axis "O", which may be analogous to axis "A" illustrated in FIG. 1. In FIG. 2 a cluster of blades 73 are secured to the rotor or rotor disk 70. As illustrated, the cluster of blades 73 comprises three fan blades 72. Of course, various embodiments of the present disclosure are not specifically limited to three fan blades 72 as more or less than three blades may be used. In any event and regardless of the amount of blades secured to the rotor or rotor disk 74 there will be a mass imbalance and inertial asymmetry in the bladed rotor or rotor disk 74 unless its entire periphery has fan blades 72 secured to it. However and as mentioned above, when new fan blades 72 are designed and developed the availability of these blades 72 is often limited or otherwise expensive to reproduce. Thus, testing occurs with a limited amount of blades 72 secured to the rotor or rotor disk 74.

As such, there is a non-zero imbalance, which is often very large, and there will be severe vibrations if this configuration is rotated about the axis "O". Accordingly and due to this configuration, a counter weight is required to zero out this imbalance. In addition to the non-zero imbalance, an asymmetry in the mass moments of inertia about the two principal axes also is in existence and will generate or increase the rotor dynamic instability during rotation in the subsequent tests. The method and teaching in this disclosure will solve these two issues simultaneously.

Figure 3:
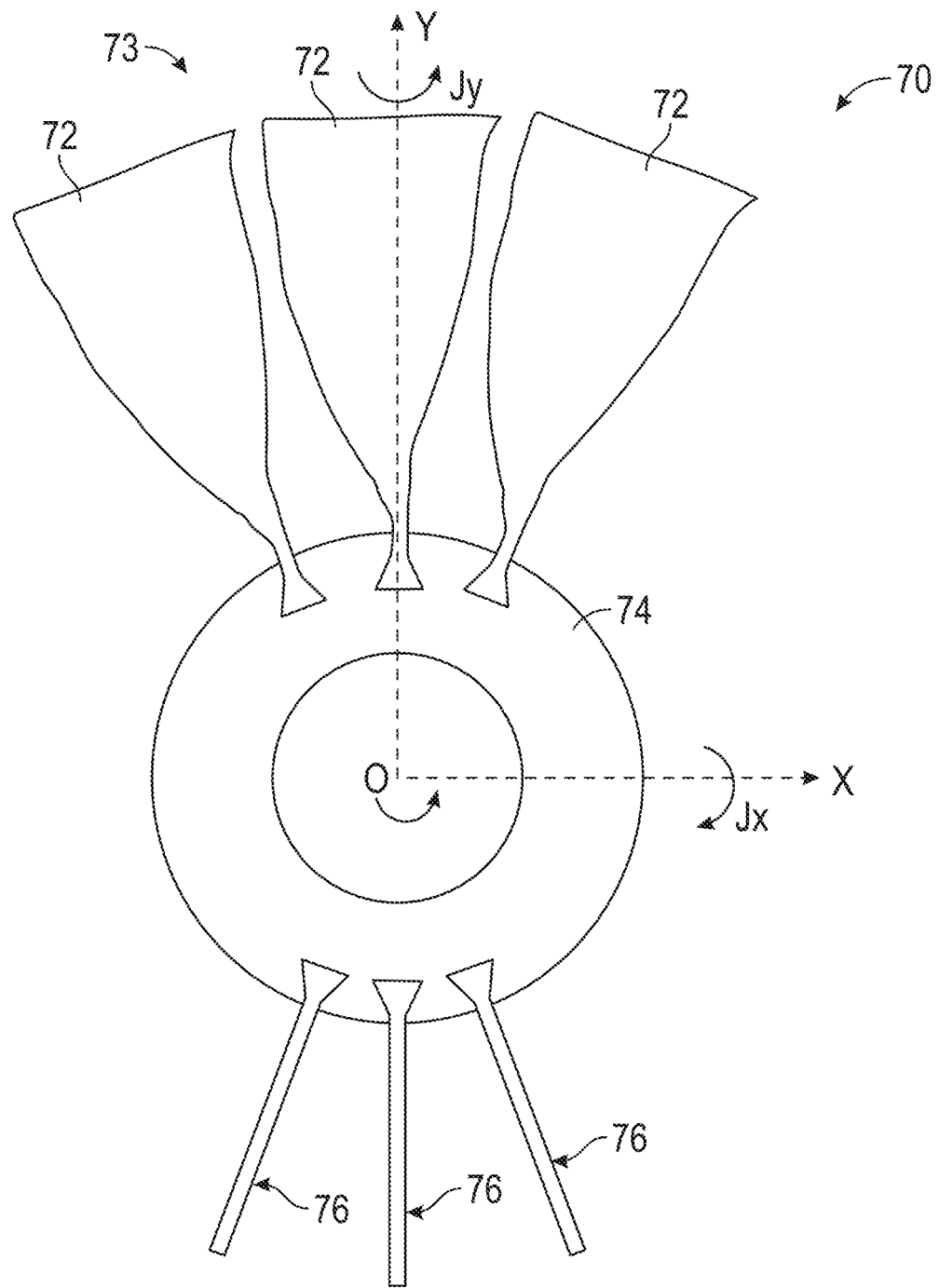
FIG. 3 is an end view of a rotor module with a limited amount of blades and a counter weight.

FIG. 3 illustrates an end view of an unsymmetrical rotor module 70 with a blade cluster 73 of a limited amount of blades 72, which in the illustrated embodiment may be fan blades 72 of the fan 42. The rotor module 70 has a zeroed imbalance by securing a counter weight 76 to the rotor module 70. This may be referred to as a bi-lobe configuration as the fan blades 72 are off-set by a counter weight 76. However and with this configuration, there is a dynamic un-symmetry as the moment of inertia Jx about the X axis is more than the moment of inertia Jy about the Y axis when this rotor module 70 is rotated about axis "O" with the counter weight configuration in FIG. 3. Therefore, this configuration may cause undesired instable vibrations during blade testing when this rotor module 70 is rotated about axis "O", which may be analogous to axis "A" illustrated in FIG. 1. The X and Y axes form a right hand coordinate system with respect to the rotor rotational direction. Note: the coordinate system is artificial for reference purpose only and not physically required in order for the present disclosure to function. The chosen coordinate system is customary and is used to simplify analysis. In theory, any coordinate system will do and will result in the same end goal, even though much more involved mathematical analysis may ensue.

Figure 4:
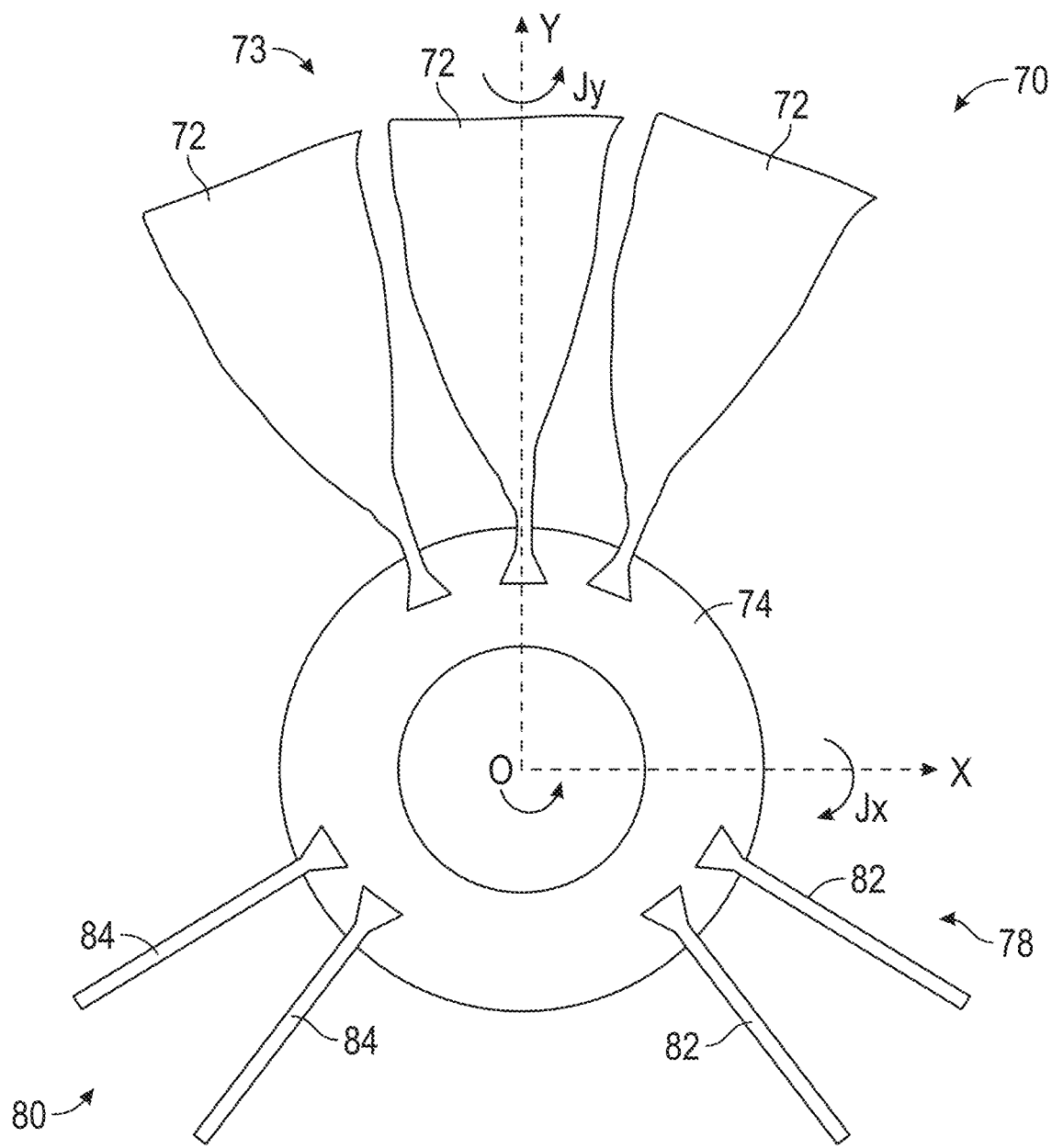
FIG. 4 is an end view of a rotor module with a limited amount of blades and an exemplary embodiment of the counter weights in accordance with the present disclosure.

FIG. 4 illustrates an end view of an unsymmetrical rotor module 70 with a blade cluster 73 of a limited amount of blades 72, which in the illustrated embodiment may be fan blades 72 of the fan 42. The rotor module 70 has a zeroed imbalance by securing a pair of counter weights 76 to the rotor module 70. This may be referred to as a tri-lobe configuration as the fan blades 72 are off-set by a pair of counter weights 76. The pair of counter weights 76 may be referred to as a first counter weight group 78 and a second counter weight group 80. In this configuration, there is no dynamic un-symmetry as the moment of inertia Jx about the X axis is equal to the moment of inertia Jy about the Y axis when this rotor module 70 is rotated about axis "O" with the counter weight configuration illustrated in FIG. 5.

In order to achieve this, for convenience of reference, a center of gravity of the blade cluster 73 is designated at the twelve clock position when referring to view illustrated in FIG. 4, and the two counter weight clusters, the first counter weight group 78 and the second counter weight group 80 are respectively at, for example, about the four and eight clock positions when referring to view illustrated in FIG. 4, thus forming a tri-lobe configuration. Based on this configuration, the counter weights of the first counter weight group 78 and the second counter weight group 80 can be sized to enable a zero nominal imbalance as well as an axi-symmetrical moment of inertia for the partially bladed rotor 74. In other words, the moment of inertia Jx about the X axis is equal to the moment of inertia Jy about the Y axis when the rotor module 70 is rotated about axis "O" with the counter weight configuration illustrated in various embodiments of the present disclosure.

Therefore and in this configuration, the potential of undesired vibrations during blade testing due to inherent imbalance or asymmetry in moments of inertia are eliminated when this rotor module 70 is rotated about axis "O", which may be analogous to axis "A" illustrated in FIG. 1.

In one embodiment, the first counter weight group 78 may comprise a pair of counter weights 82 and the second counter weight group 80 may comprise a pair of counter weights 84. The counter weights 82 may be secured separately to the rotor disk or rotor 74 or may comprise a single counter weight or the first counter weight group 78 may comprise a pair of counter weights 82 and the second counter weight group 80 may comprise a single counter weight 84 Note: at least in theory, each group 73 could have a multitude of blades as long as the ultimate objective is reached, even though less is preferred in practice for economical and simplicity reasons. Alternatively, the second counter weight group 80 may comprise a pair of counter weights 82 and the first counter weight group 78 may comprise a single counter weight 84. In one non-limiting embodiment of the present disclosure, the pair of counter weights 82 of the first counter weight group 78 are of different weights and/or sizes and/or lengths and the pair of counter weights 84 of the second counter weight group 80 are of different weights and/or sizes and/or lengths.

The centroid of mass of the blade cluster and those of the counter weights may be aligned along the rotor axial direction, or may have axial offsets between them according the distribution of centroids of masses in the entire rotating structure in the test apparatus.

Although a tri-lobe configuration is illustrated with a pair of counter weights 76, various embodiments of the present disclosure contemplate more than a pair of counter weights 76 (e.g., three, four, five etc.) as long as the moment of inertia Jx about the X axis is equal to the moment of inertia Jy about the Y axis when the rotor module 70 is rotated about axis "O" with any contemplated counter weight configuration and the center of gravity of the plurality of blades is zeroed out with respect to an axis "O" of the rotor disk.

Although, FIG. 4 illustrates a rotor module 70 with a limited amount of fan blades 72 and counter weight groups 78, 80 in accordance with the present disclosure, it is of course, understood that various exemplary embodiments of the present disclosure may applied to the testing of compressor blades and turbine blades. In other words, the present disclosure is not limited to use with fan blades 72 only.

The apparatus and method of the present disclosure allows a limited amount of blades to be used for rotor tests such as "Bird Strike" or "Containment" tests for fan blades. The apparatus and method enables a zero nominal imbalance for the entire rotor 74 and enables the elimination of the potential instability due to inertia asymmetry.

The term "about" is intended to include the degree of error associated with measurement and/or manufacturing of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor module, comprising:
   a blade cluster of a plurality of blades secured to a rotor disk of the rotor module; and
   a pair of counter weights secured to the rotor disk, wherein the pair of counter weights cause a center of gravity of the plurality of blades to be zeroed out with respect to an axis "O" of the rotor disk and the pair of counter weights cause a moment of inertia Jx about an X axis of the rotor disk is to be equal to a moment of inertia Jy about a Y axis of the rotor disk when the rotor module is rotated about the axis "O", the "X" axis and the "Y" axis are each orthogonally arranged with respect to the axis of the rotor module, and forming a right hand coordinate system with respect to the rotor module rotational direction, the blade cluster creating a mass imbalance and inertial asymmetry in the rotor disk unless the pair of counter weights are secured to the rotor disk and wherein when the center of gravity of the plurality of blades is at a twelve clock position with respect to the axis "O", one of the pair of counter weights is at a four clock position with respect to the axis "O" and the other one of the pair of counter weights is at an eight clock position with respect to the axis "O" and the plurality of blades and the pair of counter weights define a tri-lobe configuration with respect to the axis "O" of the rotor disk.

2. The rotor module as in claim 1, wherein each one of the pair of counter weights includes a first counter weight and a second counter weight.

3. The rotor module as in claim 2, wherein a weight of the first counter weight and a weight of the second counter weight are not equal.

4. The rotor module as in claim 3, wherein the plurality of blades are fan blades.

5. The rotor module as in claim 1, wherein the plurality of blades are fan blades.

6. The rotor module as in claim 1, wherein the plurality of blades are three fan blades.

7. A method for zeroing out a center of gravity of a plurality of blades with respect to an axis "O" of a rotor disk the plurality of blades are secured to, comprising:
   securing a blade cluster of the plurality of blades to the rotor disk of a rotor module; and
   securing a pair of counter weights to the rotor disk, wherein the pair of counter weights cause a center of gravity of the plurality of blades to be zeroed out with respect to the axis "O" of the rotor disk and the pair of counter weights cause a moment of inertia Jx about an X axis of the rotor disk to be equal to a moment of inertia Jy about a Y axis of the rotor disk when the rotor module is rotated about axis "O", the "X" axis and the "Y" axis are each orthogonally arranged with respect to the axis of the rotor module, and forming a right hand coordinate system with respect to the rotor module rotational direction, the blade cluster creating a mass imbalance and inertial asymmetry in the rotor disk unless the pair of counter weights are secured to the rotor disk and wherein when the center of gravity of the plurality of blades is at a twelve clock position with respect to the axis "O", one of the pair of counter weights is at a four clock position with respect to the axis "O" and the other one of the pair of counter weights is at an eight clock position with respect to the axis "O" and the plurality of blades and the pair of counter weights define a tri-lobe configuration with respect to the axis "O" of the rotor disk.

8. The method as in claim 7, wherein each one of the pair of counter weights includes a first counter weight and a second counter weight.

9. The method as in claim 8, wherein a weight of the first counter weight and a weight of the second counter weight are not equal.

10. The method as in claim 9, wherein the plurality of blades are fan blades.

* * * * *